(12) United States Patent
Fortnan et al.

(10) Patent No.: US 7,325,006 B2
(45) Date of Patent: Jan. 29, 2008

(54) SYSTEM AND METHOD FOR CATEGORY ORGANIZATION

(75) Inventors: George H. Fortnan, Port Orchard, WA (US); Henri Jacques Suermondt, Sunnyvale, CA (US); James R. Stinger, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 10/903,008

(22) Filed: Jul. 30, 2004

(65) Prior Publication Data

US 2006/0026190 A1 Feb. 2, 2006

(51) Int. Cl.
G06F 17/00 (2006.01)
(52) U.S. Cl. .............................. 707/102; 707/1; 707/2; 707/3; 707/5; 707/10
(58) Field of Classification Search .................. 707/10, 707/102, 1, 5, 7
See application file for complete search history.

(56) References Cited

U.S. PATENT DOCUMENTS

| | | | |
|---|---|---|---|
| 6,442,545 B1 * | 8/2002 | Feldman et al. ................ 707/6 |
| 6,886,010 B2 * | 4/2005 | Kostoff ........................... 707/3 |
| 2003/0154181 A1 * | 8/2003 | Liu et al. ........................ 707/1 |
| 2003/0174179 A1 * | 9/2003 | Suermondt et al. ........... 345/853 |
| 2004/0002973 A1 * | 1/2004 | Chaudhuri et al. ............ 707/7 |
| 2005/0080781 A1 * | 4/2005 | Ryan et al. ..................... 707/5 |

OTHER PUBLICATIONS

Seki et al., "An Application of Text Categorization Methods to Gene Ontology Annotation", Aug. 2005, ACM, pp. 138-145.*
Dyce Jing Zhao et al—"A Meta-Search Method with Clustering and Term Correlation"—2004—pp. 1-11.

* cited by examiner

Primary Examiner—Sathyanarayan Pannala
(74) Attorney, Agent, or Firm—Lloyd E. Dakin, Jr.

(57) ABSTRACT

A system and method for category organization is disclosed. The method discloses: receiving an information collection including a set of strings; identifying positively predictive pairs of strings; identifying negatively predictive pairs of strings; joining positively predictive pairs of strings into common categories; splitting negatively predictive pairs of strings into different categories; and organizing the categories using the negatively predictive pairs of strings. The system discloses various elements, means and instructions for performing the method.

25 Claims, 17 Drawing Sheets

| | Doc 1 | Doc 2 | Doc 3 | Doc 4 | Doc 5 | Doc 6 | Doc 7 | Doc 8 | Doc 9 |
|---|---|---|---|---|---|---|---|---|---|
| Term N | 1 | 0 | 0 | 1 | 1 | 1 | 0 | 1 | 1 |
| | | | | | | | | | |
| | | | | | | | | | |
| | | | | | | | | | |
| | | | | | | | | | |
| | | | | | | | | | |
| Term w | 0 | 1 (True Pos) | 0 (False Neg) | 0 | 1 (False Pos) | 1 | 1 | 0 | 1 |
| Term v | 0 | 1 | 1 | 0 | 0 | 1 | 1 | 0 | 1 |
| | | | | | | | | | |
| | | | | | | | | | |
| Term 2 | 1 | 0 | 0 | 1 | 1 | 0 | 0 | 1 | 1 |
| Term 1 | 0 | 1 | 0 | 0 | 1 | 0 | 1 | 1 | 0 |

Fig. 2

|   | A | B | C | D | E | F | G | H | I | J | K | L | M | N | O | P |   |
|---|---|---|---|---|---|---|---|---|---|---|---|---|---|---|---|---|---|
| A | 99 | . | . | . | . | . | . | . | . | . | . | . | . | . | . | . | A. product A |
| B | . | 99 | . | . | . | . | . | . | . | . | . | . | . | . | . | . | B. not |
| C | . | . | 99 | . | . | . | . | . | . | . | . | . | . | . | . | . | C. to |
| D | . | . | . | 99 | 99 | . | . | . | . | . | 30 | 20 | . | . | . | . | D. model A |
| E | . | . | . | . | 99 | -33 | -33 | . | -13 | . | -12 | -13 | . | . | . | . | E. sync |
| F | . | . | . | -34 | . | 99 | -32 | . | . | . | . | . | . | . | . | . | F. model B |
| G | . | . | . | -34 | . | -33 | 99 | . | . | . | . | . | . | . | . | . | G. model C |
| H | . | . | . | . | . | . | . | 99 | -21 | . | . | -16 | . | -23 | . | . | H. the |
| I | . | . | 13-13 | -21 | . | . | . | . | 99 | 99 | . | . | . | . | . | . | I. battery |
| J | . | . | 36-13 | . | . | . | . | . | 12 | 99 | 12 | . | . | . | . | . | J. unit |
| K | . | . | 24-14 | -17 | . | . | . | . | . | . | 99 | . | 14-12 | . | . | . | K. will |
| L | . | . | . | . | . | . | . | 30 | . | 14 | . | 99 | 29 | . | -14 | 15 | L. on |
| M | . | . | . | -12 | . | . | . | . | . | -12 | . | . | 99 | 99 | . | . | M. charge |
| N | . | . | . | . | . | . | . | -15 | . | . | . | . | -15 | 99 | . | . | N. is |
| O | . | . | . | -24 | . | . | . | . | -15 | . | . | . | -15 | . | 99 | -14 22 | O. screen |
| P | . | . | . | -12 | . | . | . | . | 17 | . | . | . | 24 | . | 99 | 99 | P. a |

Fig. 3A

|   | A | B | C | D | E | F | G | H | I | J | K | L | M | N | O | P |   |
|---|---|---|---|---|---|---|---|---|---|---|---|---|---|---|---|---|---|
| A | 99 | . | . | . | . | . | . | . | . | . | . | . | . | . | . | . | A. product A |
| B | . | 99 | . | . | . | . | . | . | . | . | . | . | . | . | . | . | B. not |
| C | . | . | 99 | . | . | . | . | . | . | . | . | . | . | 20 | . | . | C. to |
| D | . | . | . | 99 | . | -33 | -33 | . | -13 | . | 30 | . | -13 | . | . | . | D. model A |
| E | . | . | -34 | . | 99 | . | 99 | -32 | . | -21 | . | -12 | . | -16 | -23 | . | E. sync |
| F | . | . | -34 | . | . | 99 | . | -33 | 99 | . | . | . | . | . | . | . | F. model B |
| G | . | . | . | . | . | . | . | . | . | . | . | . | . | . | . | . | G. model C |
| H | . | . | . | . | . | . | . | 99 | . | . | . | . | . | . | . | . | H. the |
| I | . | -21 | . | . | . | . | . | . | 99 | . | 99 | 12 | 29 | . | . | . | I. battery |
| J | . | . | . | . | . | . | . | . | . | . | 99 | . | . | . | . | . | J. unit |
| K | . | . | . | . | . | . | . | . | . | 12 | 99 | 99 | . | . | . | . | K. will |
| L | . | -12 | . | . | . | . | . | . | 30 | . | . | 14 | . | 14-12 | . | . | L. on |
| M | . | -17 | . | . | . | . | . | . | -15 | . | . | -12 | . | 99 | -14 | 15 | M. charge |
| N | . | -24 | . | . | . | . | . | . | . | . | . | . | . | -15 | 99 | 22 | N. is |
| O | . | -12 | . | . | . | . | . | . | 17 | . | . | . | . | 24 | . | . | O. screen |
| P | . | . | . | . | . | . | . | . | . | . | . | . | . | . | 99 | 99 | P. a |

Fig. 3B

|   | A | B | C | D | E | F | G | H | I | J | K | L | M | N | O | P |   |
|---|---|---|---|---|---|---|---|---|---|---|---|---|---|---|---|---|---|
| A | 99 | . | . | . | . | . | . | . | . | . | . | . | . | . | . | . | A. product A |
| B | 99 | 99 | . | . | . | . | . | . | . | . | . | . | . | . | . | . | B. not ~318 |
| C | . | . | 99 | . | . | . | . | . | . | . | . | . | . | . | . | . | C. to |
| D | . | . | . | 99 | . | -33 | -33 | . | . | . | . | . | . | . | . | . | D. model A |
| E | . | . | . | . | 99 | . | . | . | . | . | . | . | . | . | -23 | . | E. sync |
| F | . | . | . | -34 | . | 99 | -32 | . | . | . | . | . | . | -16 | . | . | F. model B |
| G | . | . | . | -34 | . | -33 | 99 | . | . | . | . | . | . | . | . | . | G. model C |
| H | . | . | . | . | . | . | . | 99 | . | . | . | . | . | . | . | . | H. the |
| I | 13 | -13 | . | . | -21 | . | . | . | 99 | . | 30 | . | 29 | . | . | . | I. battery ~220 |
| J | 36 | -13 | . | -12 | . | . | . | . | . | 99 | 12 | 99 | . | 14-12 | . | . | J. unit |
| K | (24) | 14 | . | -17 | . | . | . | . | . | 12 | 99 | . | (14) | -12 | . | . | K. will ~322 |
| L | . | . | . | . | . | . | . | . | . | . | . | 99 | . | . | . | . | L. on |
| M | . | . | -12 | . | . | . | . | . | (30) | . | (14) | . | -14 | (22) | . | . | M. charge ~316 |
| N | . | . | -24 | . | . | . | . | . | -15 | . | -12 | . | . | 99 | 99 | . | N. is |
| O | . | . | -12 | . | . | . | . | . | 17 | . | . | . | . | 24 | 99 | . | O. screen |
| P | . | . | . | . | . | . | . | . | . | . | . | . | . | . | . | 99 | P. a ~324 |

| | A | B | C | D | E | F | G | H | I | J | K | L | M | N | O | P | |
|---|---|---|---|---|---|---|---|---|---|---|---|---|---|---|---|---|---|
| | 99 | . | . | . | . | . | . | . | . | . | . | . | . | . | . | . | A. product A |
| | . | 99 | . | . | . | . | . | . | . | . | . | . | . | . | . | . | B. not |
| | . | . | 99 | . | . | . | . | . | . | . | . | . | . | . | . | . | C. to |
| | . | . | . | 99 | . | -33 | -33 | . | . | . | 30 | . | 20 | . | . | . | D. model A |
| | . | . | -34 | . | 99 | . | 99 | -32 | . | . | . | -12 | . | -13 | . | . | E. sync |
| | . | . | -34 | . | . | 99 | . | -33 | 99 | . | . | . | . | . | . | . | F. model B |
| | . | . | . | . | -21 | . | 99 | . | -21 | . | . | . | -16 | . | -23 | . | G. model C |
| | . | . | . | . | . | . | . | 99 | . | . | . | . | . | . | . | . | H. the |
| | (13-13) | . | . | . | . | . | . | . | 99 | 99 | 12 | . | 29 | . | -14 | 15 | I. battery |
| | (36-13) | . | . | . | . | . | . | . | . | 30 | 14 | . | 14-12 | . | . | . | J. unit |
| | (24-14) | . | . | . | . | . | . | . | . | . | . | 99 | . | 14-12 | . | . | K. will |
| | . | . | . | . | -12 | . | . | . | . | -15 | . | . | . | . | . | . | L. on |
| | . | . | . | . | -17 | . | . | . | . | 17 | . | . | . | 99 | . | -14 22 | M. charge |
| | . | . | . | . | -24 | . | . | . | . | . | . | . | -15 | 99 | . | . | N. is |
| | . | . | . | . | -12 | . | . | . | . | . | . | . | 24 | . | 99 | . | O. screen |
| | . | . | . | . | . | . | . | . | . | . | . | . | . | . | . | 99 | P. a |

700

Positive Pair List: 404

Not – Battery
Will – Not
Not – Charge
Battery – Charge
Screen – Cracked
Screen – Dim
Stylus - Holder

Negative Pair List: 406

Sync – Battery
Screen – Sync
Dim – Cracked
Stylus – Sync
Model A – Model B

First Category List: 402

Not – Battery – Will – Charge
Screen – Cracked
Screen – Dim
Stylus - Holder ( Main ) 502

Not – Battery – Will – Charge
Screen – Cracked
Screen – Dim
Stylus – Holder

Fig. 5A

SYSTEM AND METHOD FOR CATEGORY ORGANIZATION

CROSS-REFERENCE TO RELATED OR CO-PENDING APPLICATIONS

This application relates to U.S. Ser. No. 10/902,924, entitled "System And Method For Category Discovery," filed Jul. 30, 2004.

BACKGROUND OF THE INVENTION

1. Field of the Invention

The present invention relates generally to systems and methods for data characterization, and more particularly to category organization.

2. Discussion of Background Art

Companies offering technical support to customers often accumulate a large collection of documents (e.g. call logs, text strings, survey data, etc.) detailing a variety of customer issues and solutions provided thereto. While such a huge amount of information could be very useful in tracking and responding to customer concerns (e.g. "What are some of the most common types of trouble our customers are facing?"), such a large body of data tends to quickly become unwieldy over time due to the sheer volume of documents involved and the challenge of properly categorizing the documents and retrieving the information therein.

Companies which can successfully exploit such a wealth of information, however, could be able to reduce their customer support warranty costs, improve customer service, and provide better customer self-help resources on their external web site.

In some cases large document collections, such as those available to help-desk providers, or managed within a library, are manually categorized by web site administrators and librarians or web site administrators who have carefully constructed them. Each document is manually analyzed and tagged with a best guess set of topic categories. For example, a random sample of 100 or 1000 documents out of a document collection is selected, and one or more people manually go through them to 'think up' what the big topic categories appear to be to them. Such manual categorization is slow and expensive and must also be repeated over and over again as new documents are added to the collection and old documents removed.

Current automated ways of trying to categorize and label such categories (i.e. word counting or clustering), also tend not to work very well. The categories and labels generated by such automated methods either tend not to be very meaningful or in some cases to be very confusing.

For example, word counting techniques use a computer to generate a list of the most frequent words (or capitalized names or noun phrases or whatever). Such a list however tends not to be very informative and tends to include a large number of stopwords (e.g. "of" and "the") and other useless words unless the list has been manually tailored for the set of documents. Also, since common issues may be described by more than one or different words, many words and phrases in the list may all refer to the same root issue.

Other approaches use text analysis software, such as TextAnalyst from Megaputer, which counts noun phrases. Such text analysis software however, tends to result in poor category trees, since the same basic topic could appear in multiple categories if different words are used in the document, or if there are misspellings.

Two different document categorization methods using clustering have been attempted as well. In the first approach, the documents are clustered, and partitioned. This first approach however tends to not work well with technical documents, resulting in many meaningless clusters, and distributing a single topic area over many different clusters. A second approach, such as that used by PolyVista Inc., clusters words in the documents as mini-topics. The end effect of this second approach however is much like the word count analysis discussed above, and the same types of issues tend to be distributed over multiple overlapping clusters. Such mini-topic clustering also tends to generate categories which contain many stopwords.

In response to the concerns discussed above, what is needed is a system and method for category organization that overcomes the problems of the prior art.

SUMMARY OF THE INVENTION

The present invention is a system and method for category organization. The method of the present invention includes the elements of: receiving an information collection including a set of strings; identifying positively predictive pairs of strings; identifying negatively predictive pairs of strings; joining positively predictive pairs of strings into common categories; splitting negatively predictive pairs of strings into different categories; and organizing the categories using the negatively predictive pairs of strings. The system of the present invention, includes all elements, means and instructions for performing the method.

These and other aspects of the invention will be recognized by those skilled in the art upon review of the detailed description, drawings, and claims set forth below.

BRIEF DESCRIPTION OF THE DRAWINGS

FIG. 2 is one embodiment of a bit vector matrix within the system;

FIG. 3A is one embodiment of a term prediction matrix within the system;

FIG. 3B is one example of a set of negative entries within the term prediction matrix;

FIG. 3C is one example of a set of positive entries within the term prediction matrix;

FIG. 3D is one example of a set of positive and negative pairs within the term prediction matrix;

FIG. 5A is one example of a first step in building a category hierarchy;

DETAILED DESCRIPTION OF THE PREFERRED EMBODIMENT

The present invention is a system and method which organizes a set of categories for an information collection. A "string set" is herein defined as one or more words, terms, numbers, symbols, or combinations thereof found within the information collection. The information collection may include any set of information, including help desk call logs, survey data, genomic data, published papers, documents, books, web pages, chat logs, blogs, network connection links, and so on.

The present invention identifies and organizes the strings and the information collection into meaningful categories, and category hierarchies. Meaningful category labels are generated, which describe what the strings and information collection items have in common. The present invention discovers common themes and new categories within the information collection, thereby automating information collection indexing.

While the invention is described below with reference to "terms" in a "document collection", those skilled in the art will recognize that the invention more generally applies to any "string set" in an "information collection".

Figure 1:
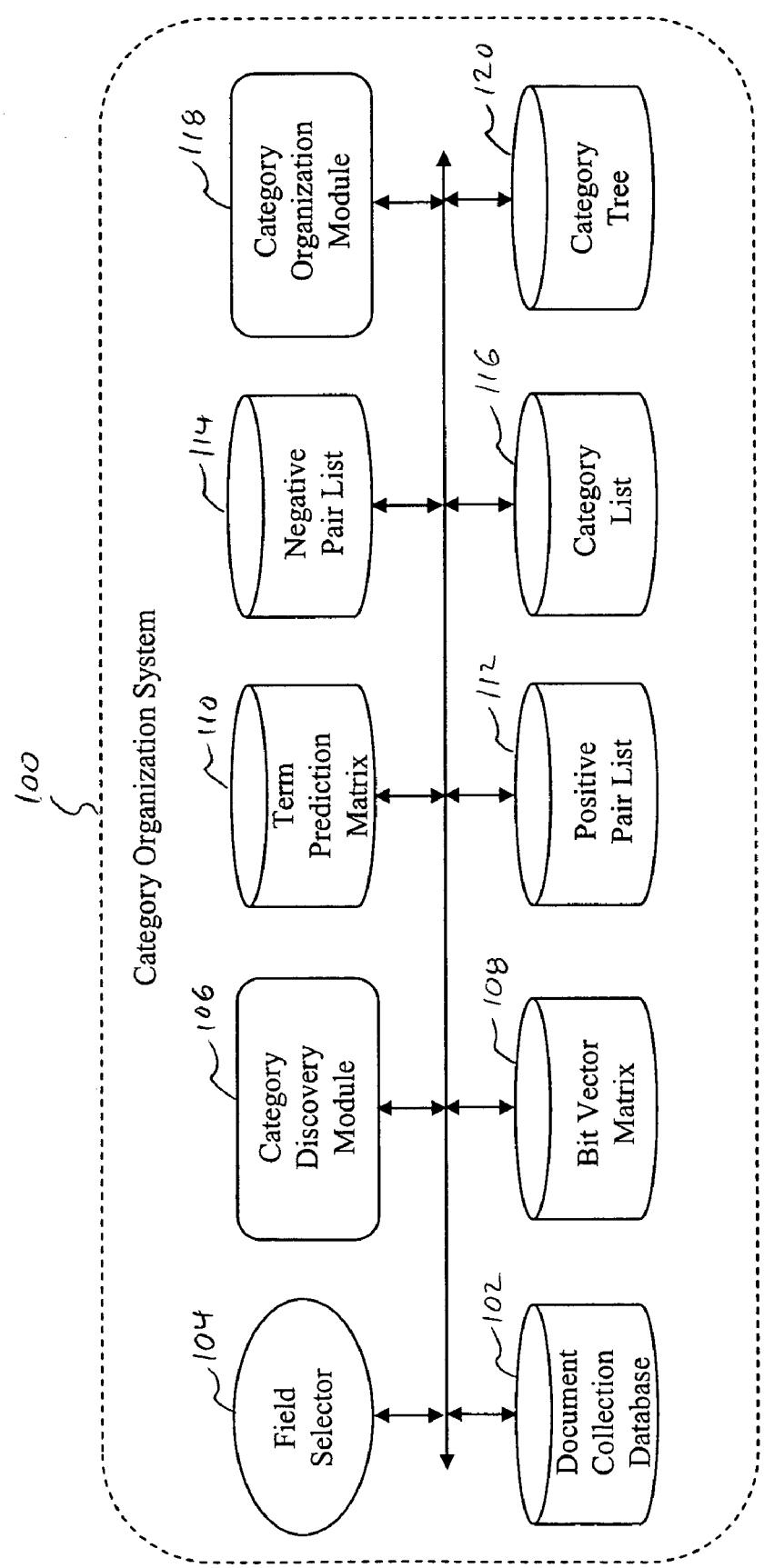
FIG. 1 is a dataflow diagram of one embodiment of a system for category organization.

FIG. 1 is a dataflow diagram of one embodiment of a system 100 for category organization. To begin, the system 100 identifies a document collection within a document collection database 102. Which document collection the system 100 identifies can be pre-programmed by a system administrator, or selected by a user. Alternatively, the document collection can be transmitted directly to the system 100 over a network. In this latter case the system 100 can form the basis of a web service provided to customers on-line.

Each document within the collection preferably includes a set of fields which the system 100 can categorize. These fields may include: a title field; a name field; a description field; a dialog field; and so on. A field selector 104 selects a field within the document collection to be categorized. The field selector 104 can be a user, such as a librarian, analyst, or other person, or the field selector 104 can be a device which computes which field to categorize based on other factors, such as the type (e.g. employee survey, customer call logs, etc.) of documents in the document collection database 102.

A category discovery module 106 calculates a frequency of occurrence for each term within each of the documents. The discovery module 106 generates a list (L) of the most frequently occurring terms within the document collection. The list is sorted by each term's frequency of occurrence. If, however, a term's frequency of occurrence is within a predetermined number from the total number of documents in the document collection database 102, then that term may be filtered out of the list as being too common.

Preferably the size (N) of the list is about 50 terms, since empirical testing data indicates that a substantially smaller list can exclude many important terms, while a substantially larger list often includes many spurious or weak terms, which increase the system's 100 computational complexity without proportionately improving upon the system's 100 categorization results. Those skilled in the art however will recognize that the list can be of any size and that different size lists may be preferred based on different applications of the present invention, differing document collections, and differing fields to be categorized.

The discovery module 106 builds a bit vector matrix 108 for the list. For each term in the list, a term bit vector, of length equal to the number of documents in the document collection, is generated by the discovery module 106. A "1" is assigned to each position in the term bit vector corresponding to those documents that contain the term, and a "0" is assigned to each position in the term bit vector corresponding to those documents that do not contain the term. Those skilled in the art will recognize that labels other than "1" or "0" may be used as well in the bit vectors.

FIG. 2 is one embodiment 200 of the bit vector matrix 108 within the system 100. Each column in the matrix 108 is a term bit vector (e.g. Term "1" 202, Term "2" 204, Term "v" 206, Term "w" 208, through Term "N" 210). Each row in the matrix 108 corresponds to a document (e.g. Doc 1 through Doc 9) in the document collection. In this embodiment 200, Term 1 202 is not in Doc 1, so a "0" is entered at entry 212 in the matrix 108. Whereas, Term 1 202 is in Doc 2, so a "1" is entered at entry 214 in the matrix 108. In an alternate embodiment, the discovery module 106 can also generate a reverse index for each term by listing those documents that contain the term.

Next, for each pair of term bit vectors (e.g. Term v 206 and Term w 208) the discovery module 106 defines "All_Positives" as a number of rows in which the first term bit vector in the pair (e.g. Term v 206) has a first label, preferably "1", (i.e. All_Positives=count(term bit vector v), wherein "count( )" is a subroutine that returns a number of "1's" in the term bit vector v 206).

For each pair of term bit vectors (e.g. Term v 206 and Term w 208) the discovery module 106 defines "All_Negatives" as a number of rows in which the first term bit vector in the pair (e.g. Term v 206) has a second label, preferably "0", (i.e. All_Negatives=(number of documents in the collection)—All_Positives).

For each pair of term bit vectors (e.g. Term v 206 and Term w 208) the discovery module 106 defines "True_Positives" as a number of rows in the matrix 108 in which both Term v and Term w have a 1 (e.g. pair 216 in the matrix 108). Mathematically, this calculation is: True_Positives=count (bit vector w <bitwise- and >bit vector v).

For each pair of term bit vectors (e.g. Term v 206 and Term w 208) the discovery module 106 defines "False_Negatives" as a number of rows in the matrix 108 in which Term v 206 has a 1 but Term w 208 has a 0 (e.g. pair 218 in the matrix 108). Mathematically, this calculation is: False_Negatives=All_Positives—True_positives.

For each pair of term bit vectors (e.g. Term v 206 and Term w 208) the discovery module 106 defines "False_Positives" as a number of rows in the matrix 108 in which Term v 206 has a 0 but Term w 208 has a 1 (e.g. pair 220 in the matrix 108). Mathematically, this calculation is: False_Positives=count(term bit vector w)—True_Positives.

The discovery module 106 then builds a term prediction matrix 110 as discussed below. Note that in a more general case of the present invention, where "terms" are replaced by "strings", the term prediction matrix 110 would more properly be labeled a string prediction matrix.

The term prediction matrix 110 contains a set of prediction values which indicate how well each of the terms in the list predict each other (e.g. how well the terms are "correlated" with respect to each other, or how well the terms positively predict or negatively predict each other). Negatively predictive terms are herein defined as terms that do not tend to occur in the same document, whereas positively predictive terms are herein defined as terms that tend to occur in the same document. Those skilled in the state of the art are aware of various measures that reflect such co-occurence and predictive power.

While the term prediction matrix 10 is preferably a Bi-Normal Separation (BNS) matrix of size N×N, which yields a negative prediction value (i.e. number) if a pair of terms are negatively correlated, and a positive prediction value (i.e. number) if a pair of terms are positively correlated, those skilled in the art will know that other term prediction matrices may be used as well. Such other matrices may include a correlation metric like LIFT that uses numbers from 0.0 to 1.0 to be negative correlation, and >1.0 for positive correlation. These other prediction matrices preferably enable methods for automated differentiation between terms that are negatively correlated and terms that are positively correlated. Note also that within this specification the phrases "positive pair", "predictive pair", and "positively correlated pair" are preferably functionally equivalent. Similarly, the phrases "negative pair", "negatively predictive pair", and "negatively correlated pair" are preferably functionally equivalent as well.

A raw BNS prediction value calculated for each entry in the matrix 110 is:

F(True_Positives/All_Positives)—F(False_Positives/All_negatives), (wherein F(x) is either an inverse cumulative distribution function or a discretized inverse cumulative distribution function of the Normal curve)

The function F(x) can take on prediction values from negative infinity (for a cumulative value of 0) to positive infinity (for a cumulative value of 1) on a scale where each unit is a standard deviation from the mean. In the preferred embodiment, a look-up table is used to reduce the time required to compute F(x) for each prediction value entry in the matrix 110. In the table F(x) is limited to a range of about −3 to +3 because limiting the range helps reduce computational complexity and prevents overflow values such as infinity.

The raw BNS prediction values ranging from −3 to +3 are preferably translated into scaled BNS prediction values ranging from −99 to +99, by multiplying each raw BNS prediction value by a constant scaling factor of approximately 99/6. These scaled BNS prediction values are then stored at each respective entry in the matrix 110.

The discovery module 106 clamps a prediction value entry within the prediction matrix 110 to zero if an absolute value of the prediction matrix 110 prediction value is below a predetermined threshold (i.e. clamp value). This simplifies later processing steps by eliminating sufficiently "independent terms" from later calculations.

In an alternate embodiment, the discovery module 106 builds only half of the term prediction matrix 110. Thus, for example, for each pair of terms v and w there must be prediction value in term prediction matrix 110 for either row v and column w or for row w and column v. This simplification may be good enough for some applications due to the commonly symmetric nature of term predictiveness. Thus, term correlations can be built unidirectionally, either below the matrix diagonal or above the diagonal.

FIG. 3A is one embodiment 300 of the term prediction matrix 110 within the system 100. In this embodiment 300 the list of terms ranges from "A" (corresponding to "Product A") to "P" (corresponding to "a") and thus N=16. This term prediction matrix 300 also includes an exemplary set of scaled BNS prediction values. Note that the "99" entry along the matrix 300 diagonal just reflects the fact that any term in the matrix 300 is completely related to itself.

The negative "−" numbers indicate a negative prediction value and the other unsigned numbers represent a positive prediction value. The dots (i.e. ".") reduce clutter in the term prediction matrix 300 and represent those prediction values which due to their minimal absolute prediction have been clamped to zero. For example, term pairs "screen" and "product A" (see matrix entries 302 and 304) are not well correlated and thus have been "clamped".

FIG. 3B is one example of a set of negative prediction values within the term prediction matrix. In the term prediction matrix 300, the BNS entries −21, −16, and −23 respectively show that "sync" 308 is negatively correlated with respect to "battery" 310, "charge" 312, and "screen" 314 and thus does not tend to occur in the same document with these terms in this document collection. Such negative predictions point toward competing categories.

FIG. 3C is one example of a set of positive prediction values within the term prediction matrix. In the term prediction matrix 300, the BNS entries 24, 30, 14, and 22 respectively show that "charge" 316 is positively correlated with respect to "not" 318, "battery" 320, "will" 322, and "a" 324 and thus tends to occur in the same document with these terms in this document collection. Such positive predictions point toward multi-term categories.

Next a set of term prediction relationships (i.e. pairs of terms with a positive prediction, negative prediction, or with an absolute prediction that falls below a predetermined "clamped" value) are extracted from the N×N term prediction matrix. Thus the discovery module 106 analyzes diametrically opposed, off-diagonal pairs of prediction values within the matrix 110, starting with the prediction values in a 2×2 sub-matrix in an upper left corner (i.e. rows 1 and 2, columns 1 and 2). The diagonal which the "off-diagonal" pairs refer to is that diagonal where the row-letter equals the column-letter in the matrix 110. Diametrically opposed refers to the relative position of the pair of matrix entry positions (u, v) and (v, u) corresponding to pair of terms u and v.

The magnitude of the prediction values in the matrix 110 signifies the strength of the positive or negative prediction. Note that while most of the discussion which follows discusses the invention only as applied to "terms" those skilled in the art recognize that the invention equally applies to multi-term phrases or string segments. If the two matrix prediction values are both positive, then the discovery module 106 attributes a positive prediction to the corresponding pair of terms and adds the pair of terms to a positive pair list 112. If the two matrix prediction values are both negative, then the discovery module 106 attributes a negative prediction to the corresponding pair of terms and adds the pair of terms to a negative pair list 114. If the matrix prediction values are both below the threshold value, then the discovery module 106 clamps the pair of terms' prediction to zero, and the pair of terms are not added to either the positive pair list 112 or the negative pair list 114. If one of the matrix prediction values is positive and the other prediction value is clamped, then the discovery module 106 attributes a positive prediction to the corresponding pair of terms and adds the pair of terms to the positive pair list 112. If one of the matrix entry values is negative and the other is clamped, then the discovery module 106 attributes a negative prediction to the corresponding pair of terms and adds the pair of terms to the negative pair list 112.

The discovery module 106 expands the 2×2 sub-matrix by one row and one column to form a 3×3 sub-matrix and again analyzes the diametrically-opposed, off-diagonal pairs of matrix prediction values in row 3 and column 3 within the matrix 110 and the positive and negative pair identification steps are repeated for the 3×3 sub-matrix entries.

The discovery module 106 iteratively expands the submatrix by one row and one column until all positive and negative pairs have been discovered within the N×N term prediction matrix 110. The two lists are preferably built in the manner just described so that the pairs of terms on both the positive pair list 112 and the negative pair list 114 are in an order of most frequent to least frequent in terms of their occurrence in the document collection. This is a result of a property of BNS matrices whereby terms are listed, in row order, from most frequent to least frequent. Those skilled in the art however will recognize however that the matrix 110 may be analyzed and pair lists built in a variety of other ways as well.

Note if only half of the term prediction matrix 110 was built, in the alternate embodiment discussed above, the positive and negative pairs would be similarly extracted from only half of the matrix using the techniques just discussed.

FIG. 3D is one example of a set of positive and negative pairs which have been identified by the discovery module 106 within exemplary matrix 300. Some of the positive pairs are: Not-Battery 326; Will-Not 328; Unit-Will 330; Not-Charge 332; and Battery-Charge 334. Some of the negative pairs are: Model A-Model B 336; Model C-Model A 338; Battery-To 340; Sync-Battery 342; and Screen-Sync 344. These pairs are identified for illustrative purposes, and those skilled in the art recognize that many other positive and negative pairs exist in the term prediction matrix 300 as well.

Next, a preferred method for iteratively building a category list 116 by sequentially evaluating each positive pair on the positive pair list 112, in view of each negative pair on the negative pair list 114 and each currently existing category within the category list 116 is presented. While a functional method for building the category list is described below only with respect a first and second set of positive pairs and first, second, and third categories, preferably the category discovery module 106 iteratively applies this functionality in turn to all positive pairs within the positive pair list 112 in the order in which the positive pairs are listed on the positive pair list 112 and with respect to all categories within the category list 116 as it is expanded.

Generally, positive pairs are used to join terms into the same category, while the negative pairs are used to split categories. Alternatively, however, the terms that occur in any positive or negative pair can be pre-processed using a marking algorithm, and grouped according to which terms they are connected.

To begin, the category discovery module 106 defines as a first category, within the category list 116, those terms within a first positive pair within the positive pair list 112.

The category discovery module 106 adds terms from a second positive pair, within the positive pair list 112, to the first category, if and only if: (a) exactly one of the terms within the second positive pair matches one of the terms in the first category; (b) the other term within the second positive pair is not negatively paired with any of the terms within the first category (i.e. there is no entry on the negative pair list 114 containing the other term within the second positive pair and any of the terms within the first category), and (c) the resulting category (i.e., expanding the first category with the other term within the second positive pair) is not already on the category list.

If the terms in the second positive pair can not be added to the first category because condition (a) is satisfied, but condition (b) is not, then: duplicate the first category and define the duplicate as a second category; remove those terms within the second category that are negatively correlated with the other term in the second positive pair; add the other term in the second positive pair to the second category; and add the second category to the category list 116, if and only if this second category is not already on the list.

If neither condition (a) nor condition (b) is satisfied for any category on the category list 116, then: define a new (i.e. "third") category as including the terms within the second positive pair and add the third category to the category list 116, if and only if this third category is not already on the category list 116.

As mentioned above, the category discovery module 106 next applies the functionality described above to all remaining positive pairs within the positive pair list 112 in the order in which the positive pairs are listed on the positive pair list 112. In this way all of the terms within the remaining positive pairs are either added to one of the existing categories within the first category list, or are added as new categories to the first category list.

Those skilled in the art, however, will recognize that there are other ways in which the category list 116 can be built using the positive pair list 112 and the negative pair list 114 as well.

The category discovery module 106 labels each category within the first category list as a concatenated set of the terms within each category. The category discovery module 106 reorders the terms within each category label according to each term's frequency of occurrence within the document collection, with a most frequently occurring term being listed as a first term in the label, and a least frequently occurring term being listed as a last term in the label. The ordering can be done iteratively on a pair by pair basis. In other words, given a set of label terms $\{w_1, w_2, \ldots, w_n\}$, measure for each pair of terms $(w_i, w_j)$ in the set which one occurs before the other more frequently in the document collection and order the terms in the description accordingly. Such ordering can also be done globally for all N terms, regardless of the categories discovered, which induces an ordering of all N terms, so that each category label can be ordered accordingly. Such term ordering tends to generate more readable category descriptions. In an alternate embodiment, however, a human can manually order the terms in a way deemed most natural or descriptive to him or her, and optionally add additional descriptive text to the category.

Figure 4:
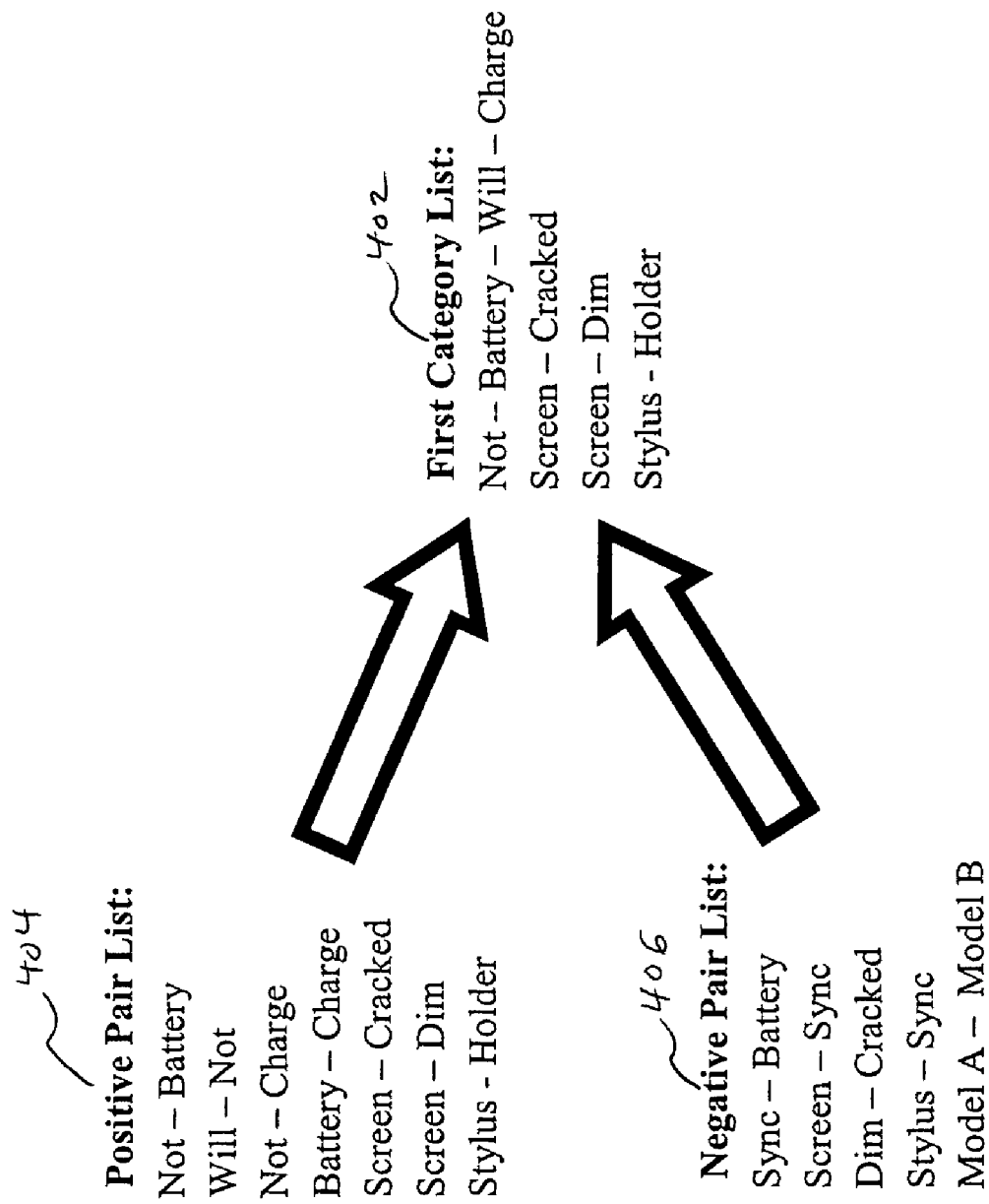
FIG. 4 is one example of a set of categories within the system.

FIG. 4 is one example of a set of categories within the system 100. The set of categories are included within a first category list 402. The first category list 402 was built from a positive pair list 404 and a negative pair list 406. For example, the "Not-Battery-Will-Charge" category was built from the "Not-Battery", "Will-Not", "Not-Charge", and "Battery-Charge" pairs on the positive pair list 404. The "Screen-Cracked" and "Screen-Dim" positive pairs were kept in separate categories due to the "Dim-Cracked" category in the negative pair list 406. The "Stylus-Holder" category was kept separate since neither the "Stylus" nor the "Holder" terms matched the other categories on the category list 402.

Next, a category organization module 118 hierarchically organizes the categories within the category list 116 into a category tree 120 and discovers any "Singleton" type categories (i.e., a category consisting of a single term) that are present within the negative pair list 114. The category organization module 118 performs the hierarchical organization using the negative pair list 114 to recursively dichotomize the categories within the category list 116. The categories are organized in a parent-child relationship up to and including a root parent at the top of the hierarchy.

To begin, the category organization module 118 assigns all of the categories within the category list 116 to a root node, called a main root, of the category tree 120. FIG. 5A is one example of a first step in building a category hierarchy and shows a main root node 502 which includes all of the categories within the first category list 402.

Figure 5B:
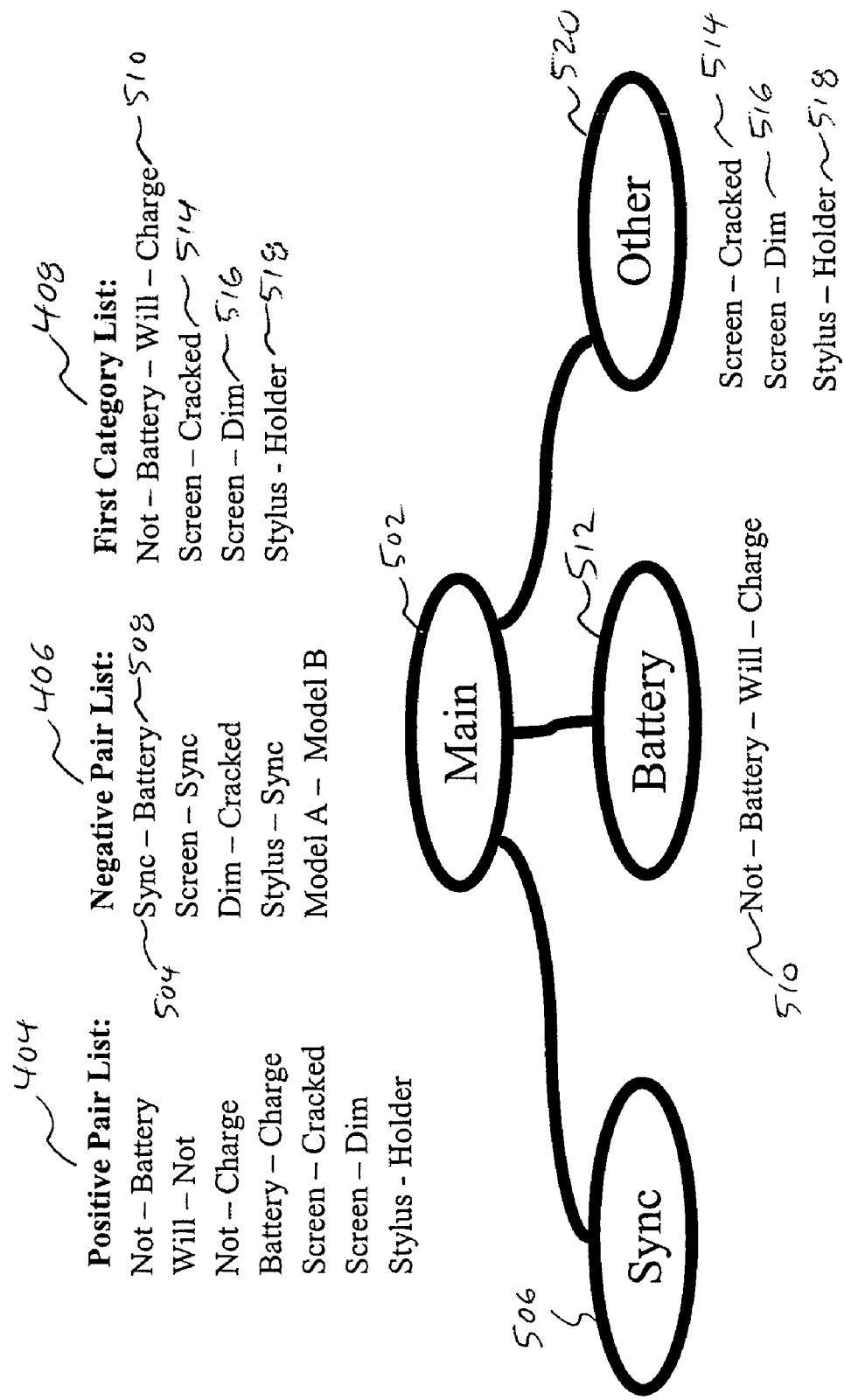
FIG. 5B is one example of a second step in building a category hierarchy.

The category organization module 118 retrieves a first negative pair on the negative pair list 406. Since the terms that make up the negative pairs are negatively correlated, categories in the main root node 502 containing these terms are on different branches of the category tree 120. FIG. 5B is one example of a second step in building a category hierarchy and is used to help describe the elements of the present invention that follow.

The category organization module 118 identifies all categories within the main root node 502 that contain the left member of the first negative pair (e.g. "Sync" 504) and assigns them to a first child node 506 of the main root node 502. However, since none of the categories in the main root node 502 contained the term "Sync" 504, the first child node 506 is a Singleton "Sync" 506 category. Thus the category organization module 118 discovered a new category which was not originally listed under the main root node 502. The category organization module 118 labels the first child node 506 with the left member term of the negative pair (i.e. "Sync").

The category organization module 18 identifies all categories within the main root node 502 that contain the right member (e.g. "Battery" 508) of the negative pair and assigns those categories (e.g. "Not-Battery-Will-Charge" 510) to a second child node 512 of the main root node 502. The category organization module 118 labels the second child node 512 with the right member term of the negative pair (i.e. "Battery").

The category organization module 118 assigns all remaining categories within the main root node 502 (e.g. "Screen-Cracked" 514, "Screen-Dim" 516, and "Stylus-Holder" 518) to a third child node 520 of the main root node 502. The category organization module 118 labels the third child node 520 "Other".

Figure 5C:
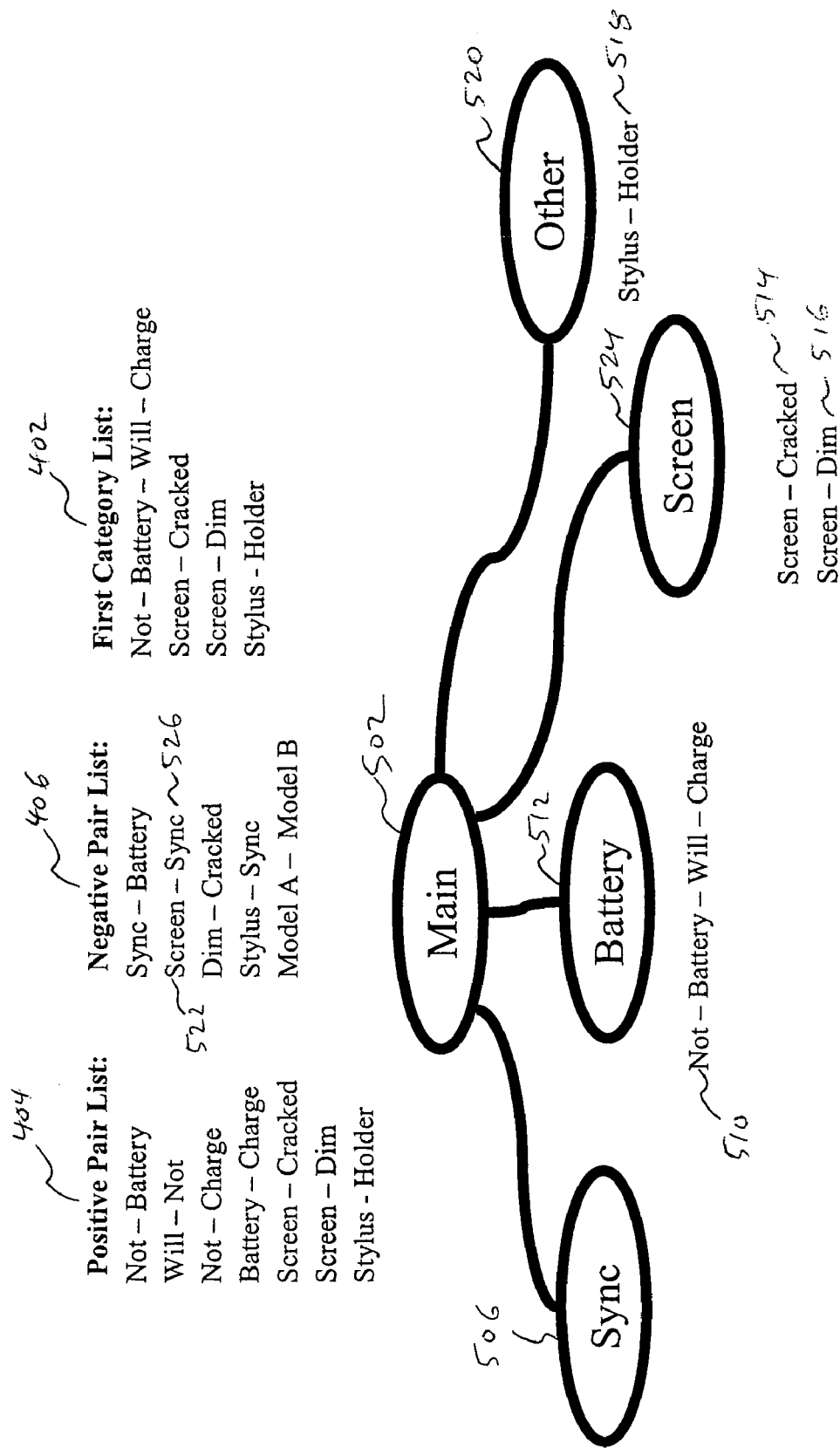
FIG. 5C is one example of a third step in building a category hierarchy.

The category organization module 118 retrieves a second negative pair (e.g. "Screen-Sync") on the negative pair list 406. FIG. 5C is one example of a third step in building a category hierarchy and is used to help describe the elements of the present invention that follow. The category organization module 118 applies the second negative pair and the functionality described above with respect to the root node 502 to each of the three child nodes 506, 512, and 520.

More specifically, the category organization module 118 identifies any categories within each of the child nodes 506, 512, and 520 that contain the left member term of the second negative pair (e.g. "Screen" 522) and, if the child node is not labeled "Other", assigns them to a new child node of that child node which contained the left member term of the second negative pair.

If the child node is labeled "Other", the category organization module 118 assigns those categories (e.g. "Screen-Cracked" 514, and "Screen-Dim" 516) under "Other" that contain the left member term of the second negative pair to a new child node 524 (i.e. a fourth child node 524) of the main root node 502. The category organization module 118 labels the fourth child node 524 with the left member term of the second negative pair (i.e. "Screen").

The category organization module 118 identifies all categories within each of the child nodes 506, 512, and 520 that contain the right member (e.g. "Sync" 526) of the second negative pair and assigns those categories (Note: there are no such categories in the example of FIG. 5C) to a new child node of that child node which contained the right member term of the second negative pair and applies a label as discussed above.

The category organization module 118 assigns all remaining categories within each of the child nodes 506, 512, and 520 to a new "Other" child node of that child node which contained the remaining categories.

Figure 5D:
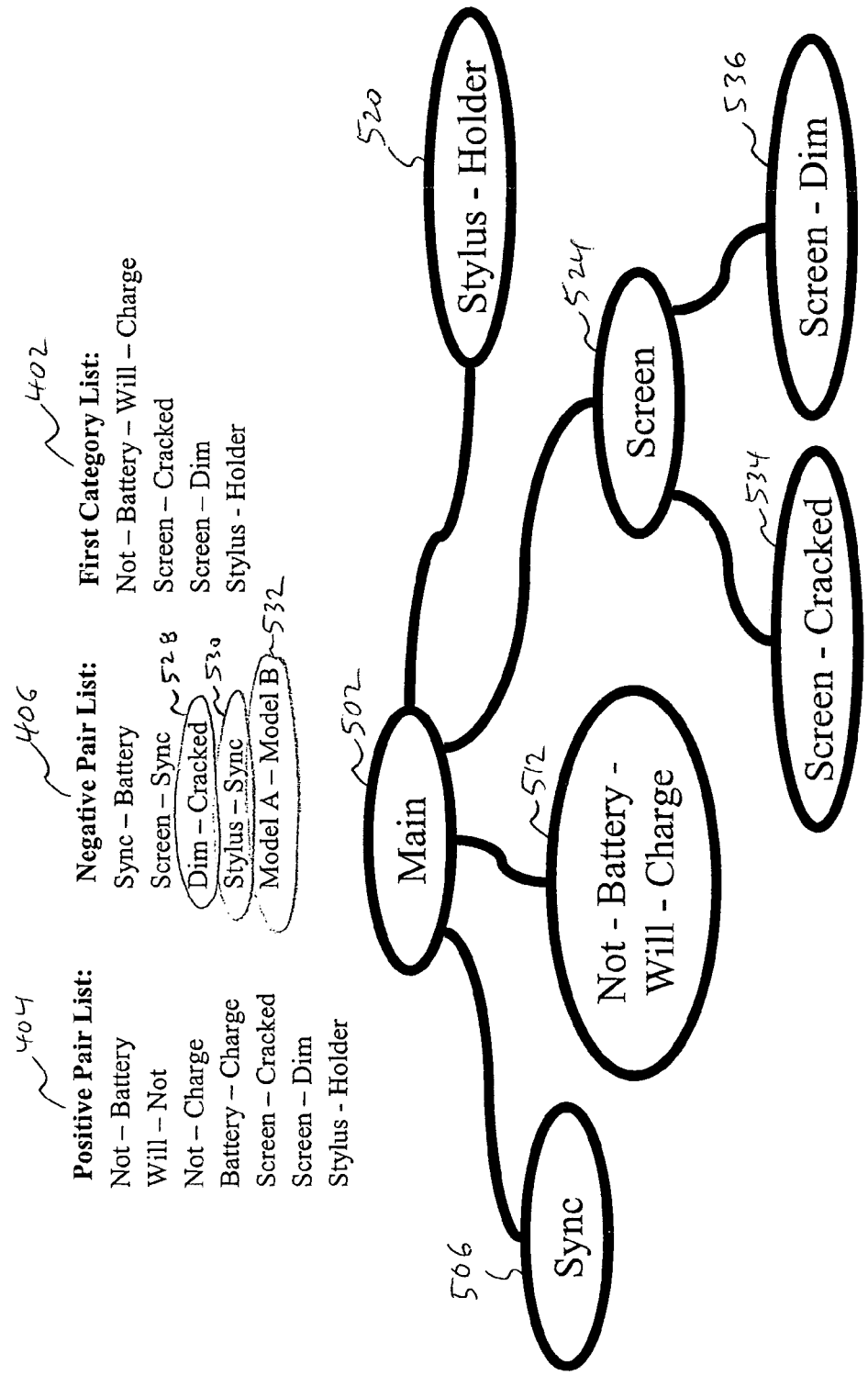
FIG. 5D is one example of a fourth step in building a category hierarchy.

The category organization module 118 retrieves in turn all subsequent negative pairs on the negative pair list 406 and continues processing those child nodes within the category tree 120 which still have more than one category listed from the first category list 402 according to the procedure discussed above. Preferably the category tree 120 is processed each time starting with those nodes closer to the main root 502, before processing each of their respective child nodes. FIGS. 5D, and E, are respectively examples of a fourth, fifth and sixth steps in building the category hierarchy and is used to help further discuss the elements of the present invention that follow. From FIG. 5D, the remaining negative pairs on the negative pair list 406 include, "Dim-Cracked" 528, "Stylus-Sync" 530, and "Model A-Model B" 532. The negative pair "Dim-Cracked" 528 resulted in the creation of new child nodes labeled "Screen-Cracked" 534 and "Screen-Dim" 536. The "Other" category child node 520 has been relabeled as "Stylus-Holder" 520 since that was the only category left under the "Other" node 520.

Figure 5E:
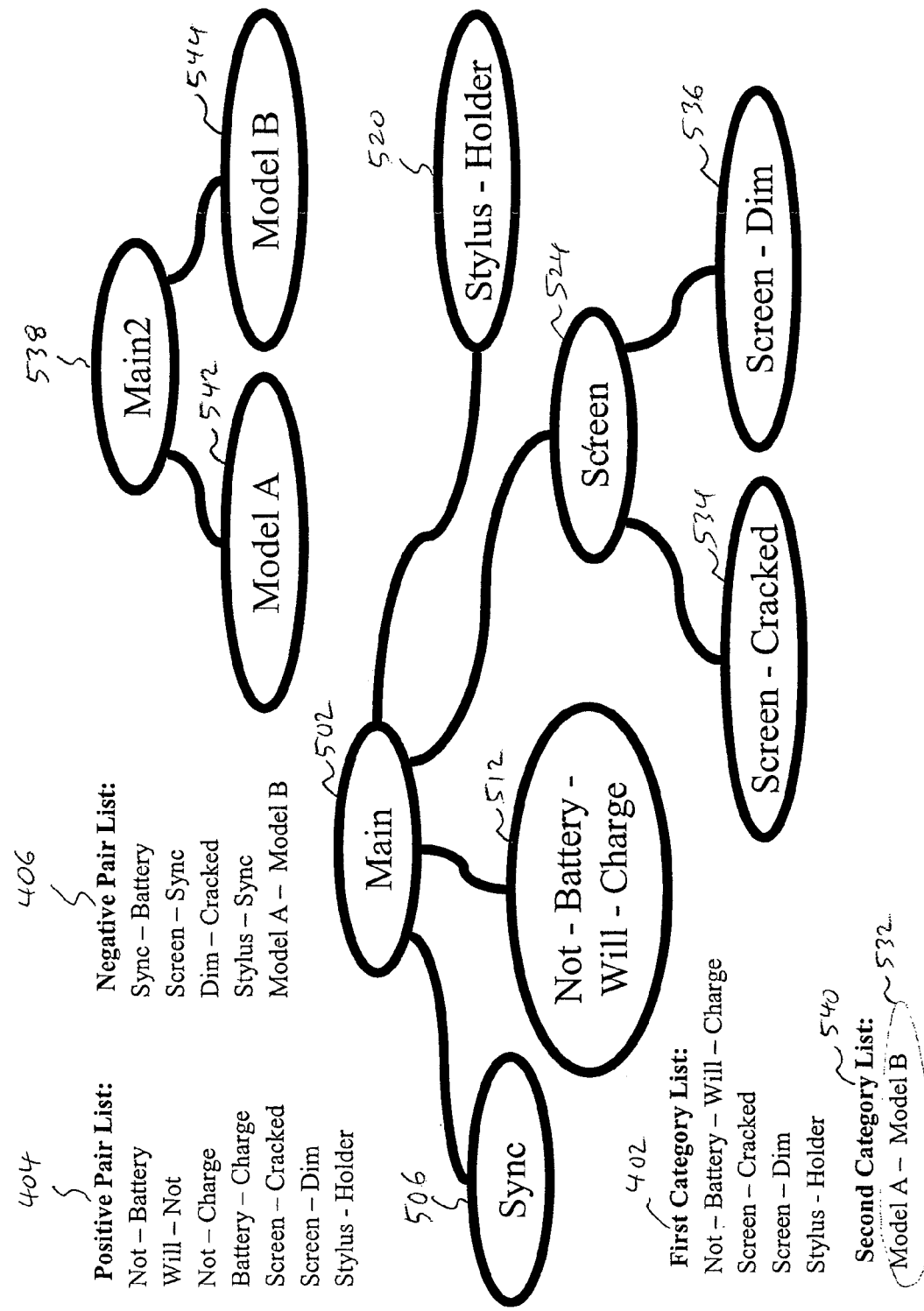
FIG. 5E is one example of a fifth step in building a category hierarchy.

If both members of a negative pair (e.g. "Model A-Model B" 532) are not found in any of the categories under the main root 502 within the category tree 120, the category organization module 118 creates a new main root (e.g. "Main2" 538 in FIG. 5E), also called an "Orphan Root", in parallel with the main root 502. The new main root 538 becomes part of a second category list 540 containing that negative pair (e.g. "Model A-Model B" 532) and new child nodes (e.g. "Model A" 542 and "Model B" 544) are created according to the method of the present invention discussed above.

Figure 6:
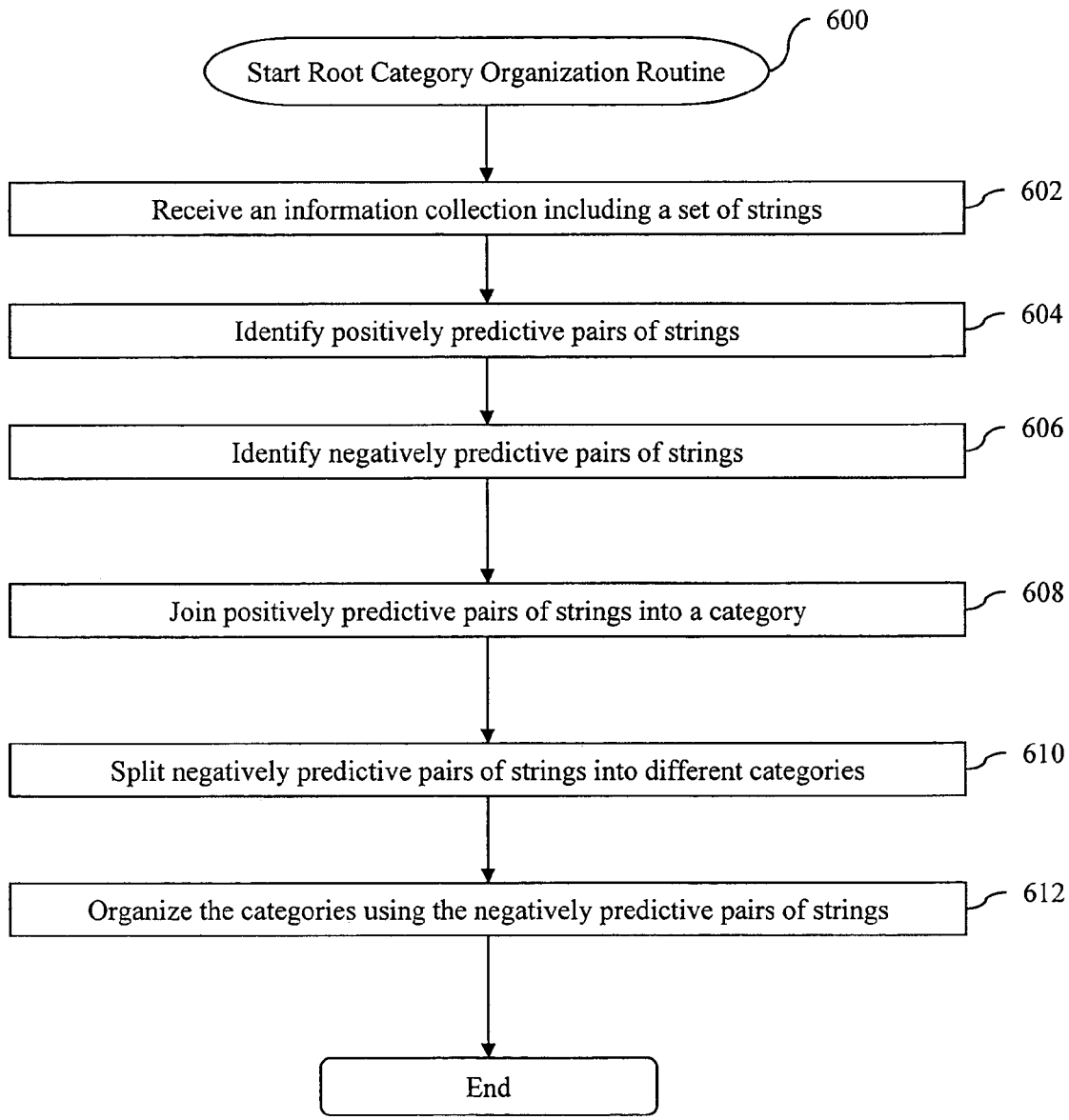
FIG. 6 is a flowchart of one root embodiment of a method for category organization.
Figure 7A:
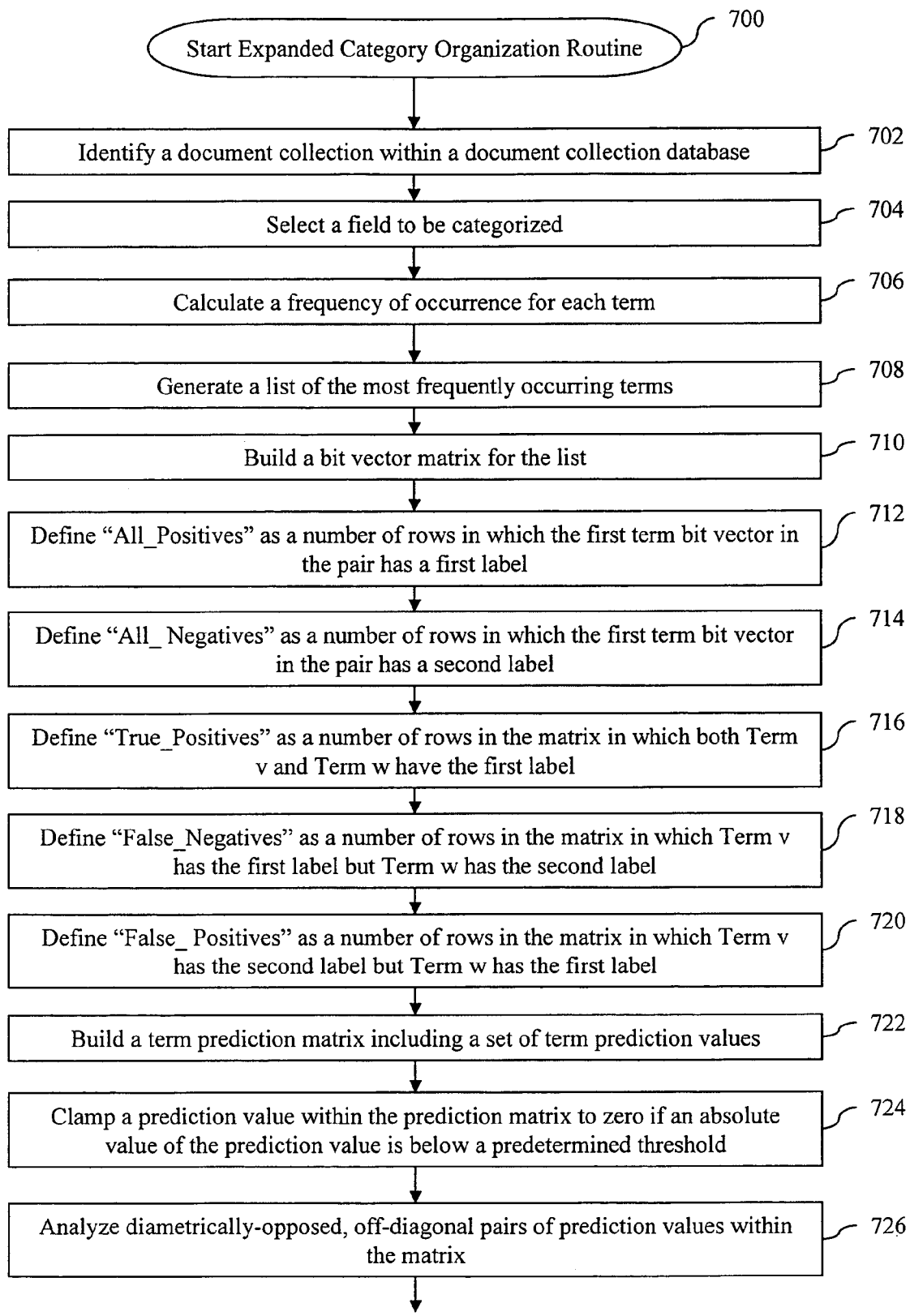
FIG. 7 is a flowchart of one expanded embodiment of the root method for category organization.
Figure 7B:
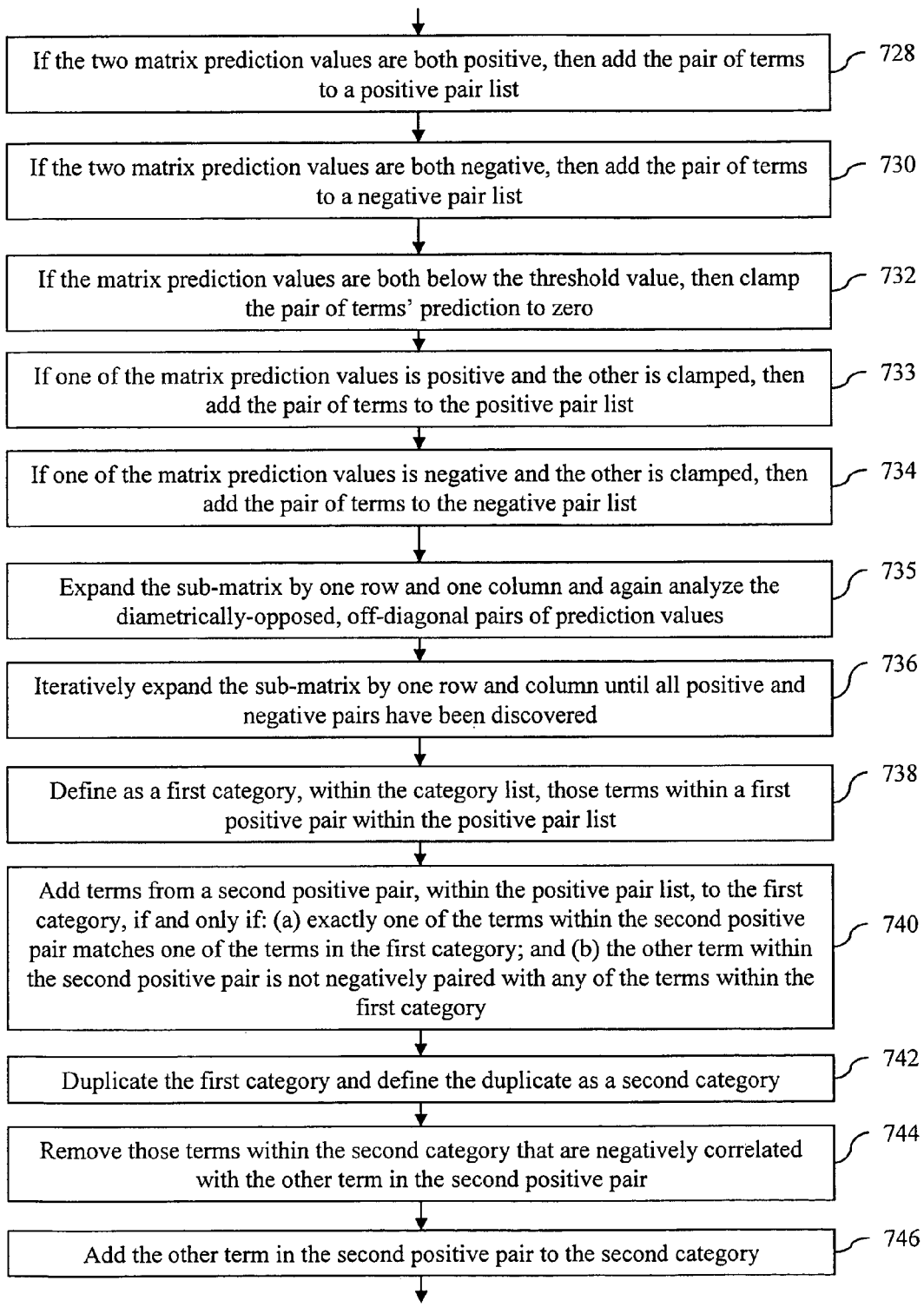
Figure 7C:
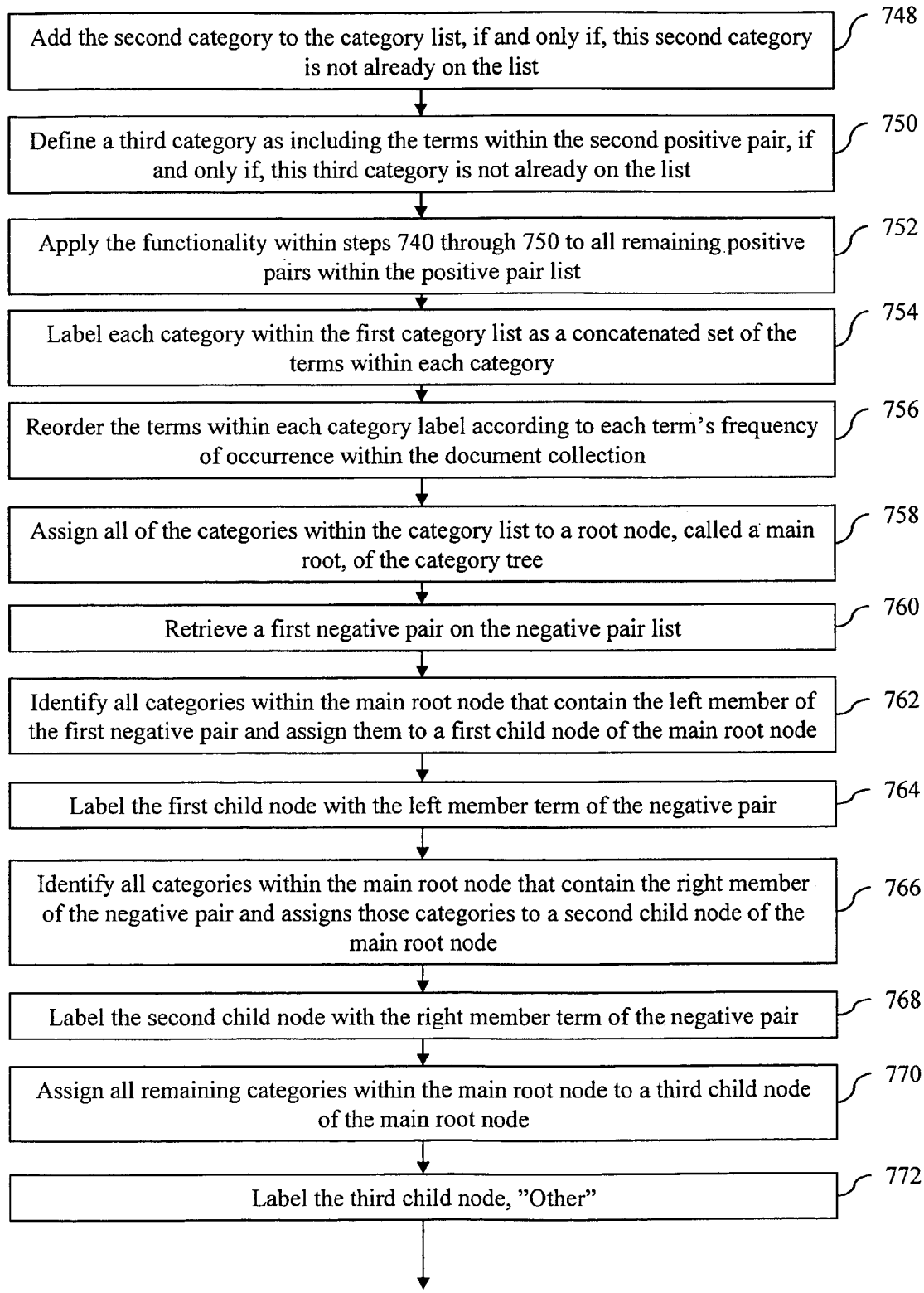
Figure 7D:
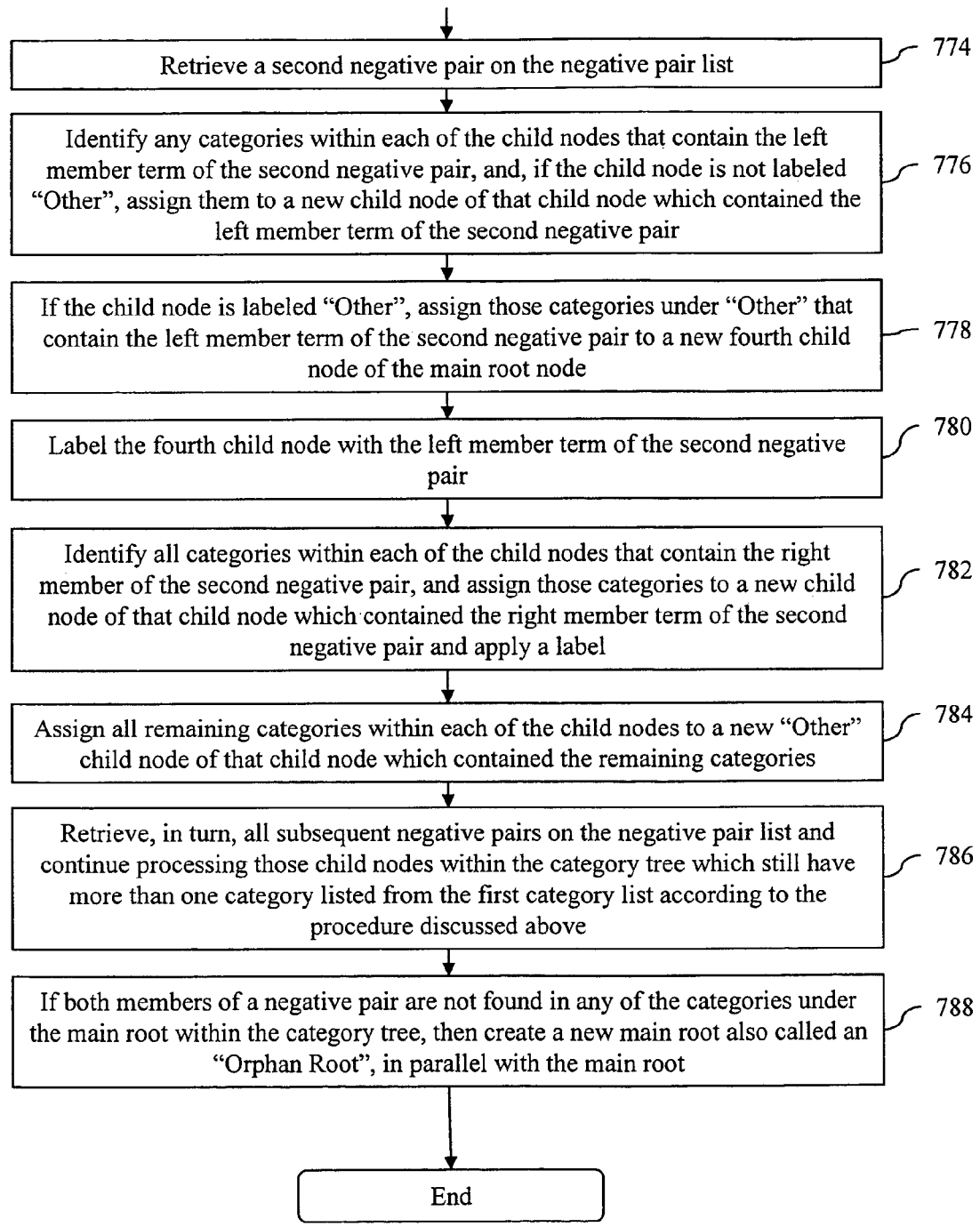

FIG. 6 is a flowchart of one root embodiment of a method 600 for category organization. In step 602, the system 100 receives an information collection including a set of strings. In step 604, the category discovery module 106 identifies positively predictive pairs of strings. In step 606, the category discovery module 106 identifies negatively predictive pairs of strings. In step 608, positively predictive pairs of strings are selectively joined into a single category. In step 610, negatively predictive pairs of strings are selectively split into different categories. In step 612, the categories ARE organized using the negatively predictive pairs of strings. The root method 600 is discussed in further detail with respect to FIG. 7.

FIG. 7 is a flowchart of one expanded embodiment 700 of the root method for category organization. To begin, in step 702, the system 100 identifies a document collection within a document collection database 102. In step 704, a field selector 104 selects a field within the document collection to be categorized. In step 706, a category discovery module 106 calculates a frequency of occurrence for each term within each of the documents. In step 708, the discovery module 106 generates a list (L) of the most frequently occurring terms within the document collection. In step 710, the discovery module 106 builds a bit vector matrix 108 for the list.

Next, in step 712, for each pair of term bit vectors the discovery module 106 defines "All_Positives" as a number of rows in which the first term bit vector in the pair has a first label. In step 714, for each pair of term bit vectors the discovery module 106 defines "All_Negatives" as a number of rows in which the first term bit vector in the pair has a second label. In step 716, for each pair of term bit vectors the discovery module 106 defines "True_Positives" as a number of rows in the matrix 108 in which both Term v and Term w have the first label. In step 718, for each pair of term bit vectors the discovery module 106 defines "False_Negatives" as a number of rows in the matrix 108 in which Term v 206 has the first label but Term w 208 has the second label. In step 720, for each pair of term bit vectors the discovery module 106 defines "False_Positives" as a number of rows in the matrix 108 in which Term v 206 has the second label but Term w 208 has the first label. In step 722, the discovery module 106 builds a term prediction matrix 110 including a set of term prediction values, as discussed above. In step 724, the discovery module 106 clamps a prediction value within the prediction matrix 110 to zero if an absolute value of the prediction value is below a predetermined threshold.

In step 726, the discovery module 106 analyzes diametrically-opposed, off-diagonal pairs of prediction values within the matrix 110, starting with a 2×2 sub-matrix in an upper left corner. In step 728, if the two matrix prediction values are both positive, then the discovery module 106 attributes a positive prediction to the corresponding pair of terms and adds the pair of terms to a positive pair list 112. In step 730, if the two matrix prediction values are both negative, then the discovery module 106 attributes a negative prediction to the corresponding pair of terms and adds the pair of terms to a negative pair list 114. In step 732, if the matrix prediction values are both below the threshold value, then the discovery module 106 clamps the prediction values to zero, and the pair of terms are not added to either the positive pair list 112 or the negative pair list 114. In step 733, if one of the matrix prediction values is positive and the other prediction value is clamped, then the discovery module 106 attributes a positive prediction to the corresponding pair of terms and adds the pair of terms to the positive pair list 112. In step 734, if one of the matrix entry values is negative and the other is clamped, then the discovery module 106 attributes a negative prediction to the corresponding pair of terms and adds the pair of terms to the negative pair list 114.

In step 735, the discovery module 106 expands the 2×2 sub-matrix by one row and one column to form a 3×3 sub-matrix and again analyzes the diametrically opposed, off-diagonal pairs of prediction values in row 3 and column 3 within the matrix 110 and the positive and negative pair identification steps (i.e. steps 728 through 730) are repeated for the 3×3 sub-matrix entries. In step 736, the discovery module 106 the sub-matrix is iteratively expanded by one row and column until all positive and negative pairs have been discovered within the NxN term prediction matrix 110.

In step 738, the category discovery module 106 defines as a first category, within the category list 116, those terms within a first positive pair within the positive pair list 112. In step 740, the category discovery module 106 adds terms from a second positive pair, within the positive pair list 112, to the first category, if and only if: (a) exactly one of the terms within the second positive pair already matches one of the terms in the first category; and (b) the other term within the second positive pair is not negatively paired with any of the terms within the first category. If the terms in the second positive pair can not be added to the first category because condition (a) is satisfied, but condition (b) is not, then: in step 742, duplicate the first category and define the duplicate as a second category; in step 744, remove those terms within the second category that are negatively correlated with the other term in the second positive pair; in step 746, add the other term in the second positive pair to the second category; and in step 748, add the second category to the category list 116, if and only if, this second category is not already on the list. If neither condition (a) nor condition (b) is satisfied, then: in step 750, define a third category as including the terms within the second positive pair, if and only if, this third category is not already on the list.

In step 752, the category discovery module 106 applies the functionality within steps 740 through 750 to all remaining positive pairs within the positive pair list 12 in the order in which the positive pairs are listed on the positive pair list 112. In step 754, the category discovery module 106 labels each category within the first category list as a concatenated set of the terms within each category. In step 756, the category discovery module 106 reorders the terms within each category label according to each term's frequency of occurrence within the document collection, with a most frequently occurring term being listed as a first term in the label, and a least frequently occurring term being listed as a last term in the label.

In step 758, the category organization module 118 assigns all of the categories within the category list 116 to a root node, called a main root, of the category tree 120. In step 760, the category organization module 118 retrieves a first negative pair on the negative pair list 406. In step 762, the category organization module 118 identifies all categories within the main root node 502 that contain the left member of the first negative pair (e.g. "Sync" 504) and assigns them to a first child node 506 of the main root node 502. In step 764, the category organization module 118 labels the first child node 506 with the left member term of the negative pair (i.e. "Sync"). In step 766, the category organization module 118 identifies all categories within the main root node 502 that contain the right member (e.g. "Battery"508) of the negative pair and assigns those categories (e.g. "Not-Battery-Will-Charge" 510) to a second child node 512 of the main root node 502. In step 768, the category organization module 118 labels the second child node 512 with the right member term of the negative pair (i.e. "Battery"). In step 770, the category organization module 118 assigns all remaining categories within the main root node 502 (e.g. "Screen-Cracked" 514, "Screen-Dim" 516, and "Stylus-Holder" 518) to a third child node 520 of the main root node 502. In step 772, the category organization module 118 labels the third child node 520 "Other".

In step 774, the category organization module 18 retrieves a second negative pair (e.g. "Screen-Sync") on the negative pair list 406. In step 776, the category organization module 118 identifies any categories within each of the child nodes 506, 512, and 520 that contain the left member term of the second negative pair (e.g. "Screen" 522) and, if the child node is not labeled "Other", assigns them to a new child node of that child node which contained the left member term of the second negative pair. In step 778, if the child node is labeled "Other", the category organization module 118 assigns those categories (e.g. "Screen-Cracked" 514, and "Screen-Dim" 516) under "Other" that contain the left member term of the second negative pair to a new child node 524 (i.e. a fourth child node 524) of the main root node 502. In step 780, the category organization module 118 labels the fourth child node 524 with the left member term of the second negative pair (i.e. "Screen"). In step 782, the category organization module 118 identifies all categories within each of the child nodes 506, 512, and 520 that contain the right member (e.g. "Sync" 526) of the second negative pair and assigns those categories to a new child node of that child node which contained the right member term of the second negative pair and applies a label as discussed above.

In step 784, the category organization module 118 assigns all remaining categories within each of the child nodes 506, 512, and 520 to a new "Other" child node of that child node which contained the remaining categories.

In step 786, the category organization module 118 retrieves in turn all subsequent negative pairs on the negative pair list 406 and continues processing those child nodes within the category tree 120 which still have more than one category listed from the first category list 402 according to the procedure discussed above. In step 788, if both members of a negative pair (e.g. "Model A-Model B" 532) are not found in any of the categories under the main root 502 within the category tree 120, the category organization module 118 creates a new main root (e.g. "Main2" 538 in FIG. 5E), also called an "Orphan Root", in parallel with the main root 502.

The procedures discussed above can be performed by instructions on a computer-usable medium executed by a computer. While one or more embodiments of the present invention have been described, those skilled in the art will recognize that various modifications may be made. Variations upon and modifications to these embodiments are provided by the present invention, which is limited only by the following claims.

What is claimed is:

1. A method executed by a computer for category organization, comprising:
   receiving an information collection including a set of strings;
   identifying positively predictive pairs of strings;
   identifying negatively predictive pairs of strings;
   joining positively predictive pairs of strings into common categories;
   splitting negatively predictive pairs of strings into different categories;
   according to the joining and splitting, providing a set of categories to enable categorization of information in a database; and
   organizing the set of categories using the negatively predictive pairs of strings,
   wherein the identifying elements include identifying the positively and negatively predictive pairs of strings using a string prediction matrix; and
   further comprising,
      ordering the negatively predictive pairs within a negative pair list according to a position of a negatively predictive pair's predictive value within the string prediction matrix; and
   wherein organizing includes,
      organizing the set of categories using the negatively predictive pairs in an order which depends on how the negatively predictive pairs are listed in the negative pair list.

2. The method of claim 1, wherein organizing includes:
   recursively dichotomizing the categories using the negatively predictive pairs of strings.

3. The method of claim 1, wherein the information collection is in the database, and wherein categorization of information in the database comprises categorization of the information collection.

4. The method of claim 1, wherein:
   providing the set of categories comprises providing the set of categories that represent issues of a company.

5. A method executed by a computer for category organization, comprising:
   receiving an information collection including a set of strings;
   identifying positively predictive pairs of strings;
   identifying negatively predictive pairs of strings;
   joining positively predictive pairs of strings into common categories;
   splitting negatively predictive pairs of strings into different categories;
   according to the joining and splitting, providing a set of categories to enable categorization of information in a database; and
   organizing the set of categories using the negatively predictive pairs of strings, wherein organizing includes:
   identifying a group of the categories assigned to a parent node;
   retrieving a negatively predictive pair;
   identifying a category within the parent node that contains one member of the negatively predictive pair; and
   generating a child node of the parent node containing the identified category.

6. The method of claim 5, wherein:
   identifying the category within the parent node includes identifying a category within the parent node that contains a left member of the negatively predictive pair; and
   generating the child node includes generating a child node of the parent node containing the identified category which includes the left member.

7. The method of claim 5, wherein:
   identifying the category within the parent node includes identifying a category within the parent node that contains a right member of the negatively predictive pair; and
   generating the child node includes generating a child node of the parent node containing the identified category which includes the right member.

8. A method executed by a computer for category organization, comprising:
   receiving an information collection including a set of strings;
   identifying positively predictive pairs of strings;
   identifying negatively predictive pairs of strings;
   joining positively predictive pairs of strings into common categories;
   splitting negatively predictive pairs of strings into different categories;
   according to the joining and splitting, providing a set of categories to enable categorization of information in a database; and
   organizing the set of categories using the negatively predictive pairs of strings, wherein organizing includes:
   identifying a group of the categories assigned to a parent node;
   retrieving a negatively predictive pair, having a first member and a second member;
   determining that one or more of the group of categories within the parent node include the second member but each of the group of categories lacks the first member; and
   generating a child node of the parent node containing the first member of the negatively predictive pair.

9. The method of claim 8, wherein generating includes:
   generating a Singleton child node of the parent node containing only the first member of the negatively predictive pair.

10. A method executed by a computer for category organization, comprising:
   receiving an information collection including a set of strings;

identifying positively predictive pairs of strings;
identifying negatively predictive pairs of strings;
joining positively predictive pairs of strings into common categories;
splitting negatively predictive pairs of strings into different categories;
according to the joining and splitting, providing a set of categories to enable categorization of information in a database; and
organizing the set of categories using the negatively predictive pairs of strings, wherein organizing includes:
defining a category tree, having a first root node;
assigning the categories to the root node;
retrieving a first negatively predictive pair, having a left member and a right member, from a list of the negatively predictive pairs of strings;
identifying all categories within the first root node that contain the left member;
assigning those categories containing the left member to a first child node of the first root node;
identifying all categories within the first root node that contain the right member; and
assigning those categories containing the right member to a second child node of the first root node.

11. The method of claim 10, wherein organizing further includes:
creating a new Singleton child node of the first root node, if none of the categories within the first root node contain the left member.

12. The method of claim 10, wherein organizing further includes:
creating a second root node in parallel with the first root node, if both members of the negatively predictive pair are not included within any of the categories under the first root node; and
assigning the members of the negatively predictive pair, which are not included within any of the categories under the first root node, to the second root node.

13. The method of claim 12, wherein organizing further includes:
assigning categories remaining in the first root node to a third child node of the first root node.

14. The method of claim 13, wherein organizing further includes:
retrieving a second negatively predictive pair, also having a left member and a right member, from the list of the negatively predictive pairs of strings;
identifying a category within one of the three child nodes that contain the left member string of the second negatively predictive pair; and
assigning the category containing the left member string of the second negatively predictive pair to a new child node of that child node which contains the category containing the left member string of the second negatively predictive pair, if the child node is not the third child node.

15. The method of claim 13, wherein organizing further includes:
retrieving a second negatively predictive pair, also having a left member and a right member, from the list of the negatively predictive pairs of strings;
identifying a category within one of the three child nodes that contain the left member string of the second negatively predictive pair; and
assigning the category containing the left member string of the second negatively predictive pair to a fourth child node of the first root node, if the child node is the third child node.

16. The method of claim 14, wherein organizing further includes:
identifying all categories within each of the child nodes that contain the right member of the second negatively predictive pair; and
assigning those categories to a new child node of that child node which contains the category containing the right member string of the second negatively predictive pair.

17. The method of claim 16:
assigning all remaining categories within each of the child nodes to a new fifth child node of that child node which contains the remaining categories.

18. The method of claim 17:
retrieving in turn all subsequent negatively predictive pairs and processing those child nodes within the category tree which still include more than one category.

19. A method executed by a computer for category organization, comprising:
receiving an information collection including a set of strings;
identifying positively predictive pairs of strings;
identifying negatively predictive pairs of strings;
joining positively predictive pairs of strings into common categories;
splitting negatively predictive pairs of strings into different categories;
according to the joining and splitting, providing a set of categories to enable categorization of information in a database; and
organizing the set of categories using the negatively predictive pain of strings, wherein organizing includes:
identifying a group of the categories assigned to a parent node;
retrieving a negatively predictive pair, having a first member and a second member;
determining that each of the group of categories within the parent node lack both the first member and the second member; and
generating a new node in parallel with the parent node containing the first and second members.

20. A computer-readable storage medium storing instructions that when executed by a computer perform category organization, comprising:
receiving an information collection including a set of strings;
identifying positively predictive pairs of strings;
identifying negatively predictive pairs of strings;
joining positively predictive pairs of strings into common categories;
splitting negatively predictive pairs of strings into different categories;
according to the joining and splitting, providing set of categories to enable categorization of information in a database; and
organizing the set of categories using the negatively predictive pairs of strings,
wherein the identifying elements include identifying the positively and negatively predictive pairs of strings using a string prediction matrix; and
wherein the instructions when executed cause the computer to further order the negatively predictive pairs within a negative pair list according to a position of a negatively predictive pair's predictive value within the string prediction matrix; and wherein organizing includes, organizing the set of categories using the negatively predictive pairs in an order which depends on how the negatively predictive pairs are listed in the negative pair list.

21. The computer-readable storage medium of claim 20, wherein:

providing the set of categories comprises providing the set of categories that represent issues of a company.

22. A computer-readable storage medium storing instructions that when executed by a computer perform category organization, comprising:

receiving an information collection including a set of strings;

identifying positively predictive pairs of strings;

identifying negatively predictive pairs of strings;

joining positively predictive pairs of strings into common categories;

splitting negatively predictive pairs of strings into different categories;

according to the joining and splitting, providing a set of categories to enable categorization of information in a database; and organizing the set of categories using the negatively predictive pairs of strings, wherein organizing includes:

identifying a group of the categories assigned to a parent node;

retrieving a negatively predictive pair;

identifying a category within the parent node that contains one member of the negatively predictive pair; and generating a child node of the parent node containing the identified category.

23. The computer-readable storage medium of claim 22, wherein:

identifying the category within the parent node includes identifying a category within the parent node that contains a left member of the negatively predictive pair; and generating the child node includes generating a child node of the parent node containing the identified category which includes the left member.

24. The computer-readable storage medium of claim 22, wherein:

identifying the category within the parent node includes identifying a category within the parent node that contains a right member of the negatively predictive pair; and generating the child node includes generating a child node of the parent node containing the identified category which includes the right member.

25. A computer-readable storage medium storing instructions that when executed by a computer perform category organization, comprising:

receiving an information collection including a set of strings;

identifying positively predictive pairs of strings;

identifying negatively predictive pairs of strings;

joining positively predictive pairs of strings into common categories;

splitting negatively predictive pairs of strings into different categories;

according to the joining and splitting, providing a set of categories to enable categorization of information in a database; and organizing the set of categories using the negatively predictive pairs of strings, wherein organizing includes:

identifying a group of the categories assigned to a parent node;

retrieving a negatively predictive pair, having a first member and a second member, determining that one or more of the group of categories within the parent node include the second member but each of the group of categories lacks the first member; and generating a child node of the parent node containing the first member of the negatively predictive pair.

* * * * *

UNITED STATES PATENT AND TRADEMARK OFFICE
CERTIFICATE OF CORRECTION

PATENT NO. : 7,325,006 B2
APPLICATION NO. : 10/903008
DATED : January 29, 2008
INVENTOR(S) : George H. Fortnan et al.

It is certified that error appears in the above-identified patent and that said Letters Patent is hereby corrected as shown below:

Title Pg, Item (75) and (12), under "Inventors", in column 1, line 1, delete "Fortnan" and insert -- Forman --, therefor.

In column 5, line 1, delete "10" and insert -- 110 --, therefor.

In column 9, line 27, delete "18" and insert -- 118 --, therefor.

In column 12, line 9, delete "12" and insert -- 112 --, therefor.

In column 12, line 45, delete "18" and insert -- 118 --, therefore.

In column 16, line 37, in Claim 19, delete "pain" and insert -- pairs --, therefor.

In column 16, line 58, in Claim 20, after "providing" insert -- a --.

In column 18, line 32, in Claim 25, after "member" delete "," and insert -- ; --, therefor.

Signed and Sealed this

Tenth Day of June, 2008

JON W. DUDAS
*Director of the United States Patent and Trademark Office*